Nov. 25, 1958
G. T. SEABORG ET AL
2,861,866
WET FLUORIDE SEPARATION METHOD
Filed Nov. 3, 1944
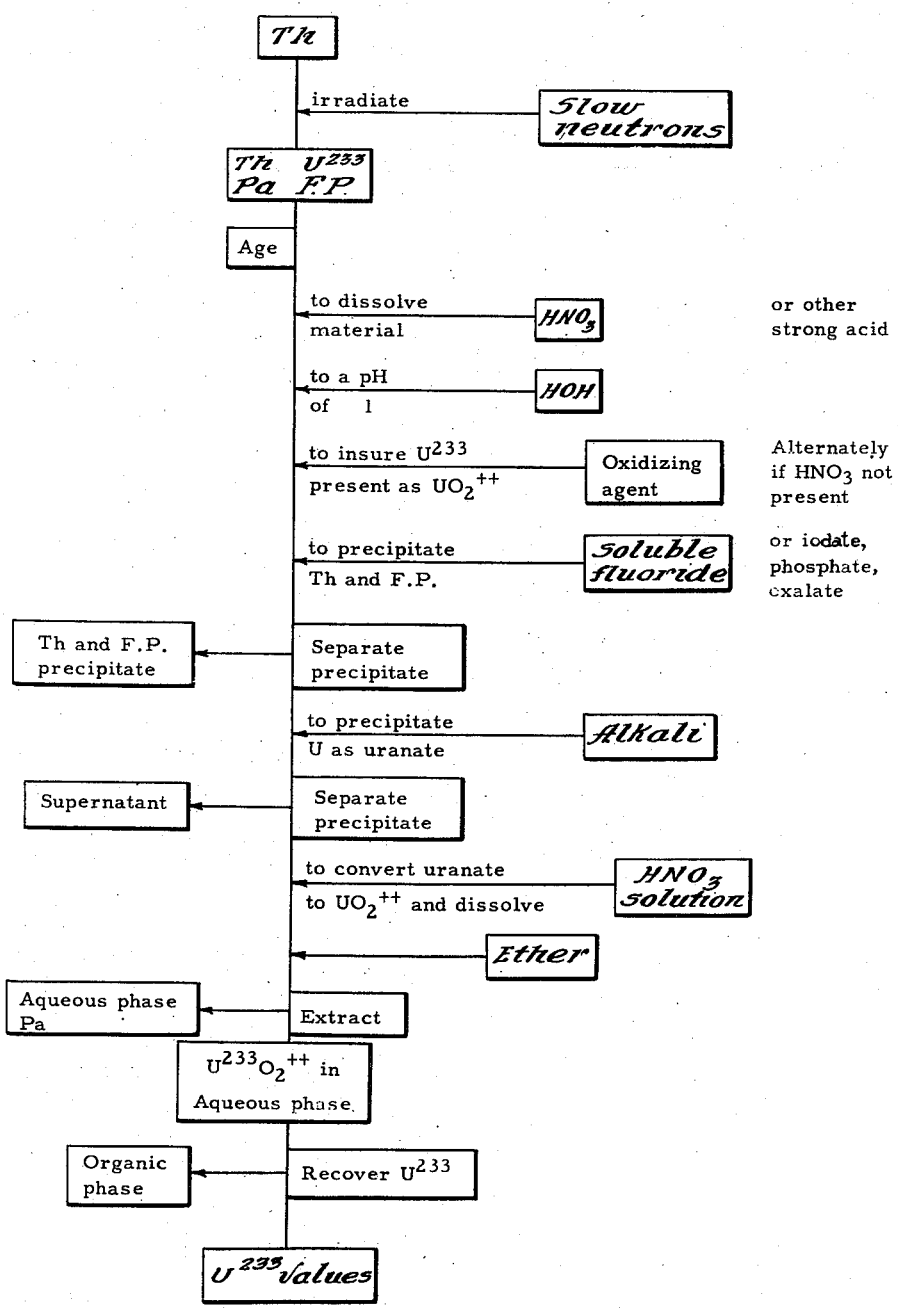
INVENTORS:
Glenn T. Seaborg
John W. Gofman
Raymond W. Stoughton
By: Roland A. Anderson
Attorney

2,861,866

WET FLUORIDE SEPARATION METHOD

Glenn T. Seaborg, Chicago, Ill., John W. Gofman, Berkeley, Calif., and Raymond W. Stoughton, Oak Ridge, Tenn., assignors to the United States of America as represented by the United States Atomic Energy Commission Application November 3, 1944, Serial No. 561,835

9 Claims. (Cl. 23—14.5)

The invention relates to the separation of the isotope of uranium having a mass number of 233 from foreign products, and more particularly relates to the separation of such isotope (designated herein as $U^{233}$) from foreign products, such as thorium and fission products, present in neutron-irradiated thorium.

In this specification and claims the name of the element is used to designate the element generically, either in its elemental state or combined in a compound unless otherwise indicated by the sense in which it is used or by a specific designation such as "metal" or "elemental."

It is known that the bombardment of thorium with fast neutrons of energies above about 2 million electron volts (2 m. e. v.) results in a fission of the thorium. We have discovered that the bombardment of thorium with neutrons having energies of below 1 million electron volts (1 m. e. v.) results in the production of $Pa^{233}$ and ultimately of $U^{233}$ through the decay of $Pa^{233}$, and further we have found that $U^{233}$ undergoes fission with neutrons of such low energies as below 1 million electron volts (1 m. e. v.) and even with thermal neutrons.

The reaction of thorium with slow and moderately fast neutrons may be summarized as follows:

$$_{90}Th^{232} + _0n^1 \longrightarrow {_{90}Th^{233}} + \gamma$$

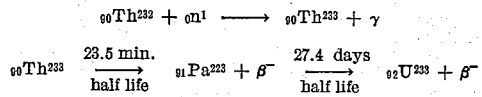

The fission products which are produced as a result of the fission of $U^{233}$ with slow and moderately fast neutrons are, so far as we have been able to determine, the same as those produced by the fission of $U^{235}$. They consist of a large number of elements which generally fall into a light group with atomic numbers from 35 to 46 incl. and a heavy group with atomic numbers from 51 to 60 incl., and which undergo beta decay. The fission products which have a half life of more than three days will remain in the reaction mass in substantial quantities at least one month after the termination of the reaction, and the removal or elimination of these products by our process is particularly advantageous. Among these products are: Sr, Y, Zr, Cb, Ru, Te, I, Xe, Cs, Ba, La, and Ce of a 20 day half life, and Ce of a 200 day half life.

On the accompanying drawing a flow sheet is shown which illustrates the method of this invention.

In accordance with one embodiment of this invention, the mass of thorium is subjected to the action of neutrons, the majority of which have energies below 1 million electron volts, and the reaction of the neutrons with the thorium is terminated prior to the time when the neutrons are absorbed by the $U^{233}$ at the same rate that they are absorbed by the $Th^{232}$. This limit is approximately when the weight ratio of $U^{233}$ to unreacted $Th^{232}$ is 1 to 100. In other words, the reaction of $Th^{232}$ with neutrons should preferably be terminated before the amount of $U^{233}$ is approximately 1 percent of the amount of thorium present in the mass. When the reaction is terminated at or prior to this point there is also no danger, during the reaction, of a substantial decomposition of the $U^{233}$ taking place by a nuclear self-sustaining chain reaction.

It is generally desirable to terminate the reaction of the neutrons with $Th^{232}$ when the amount of $U^{233}$ is much less than 1 percent of the unreacted amount of $Th^{232}$ in order to reduce the amount of fission products and make it possible to isolate the $U^{233}$ by ordinary chemical means without the extensive use of refrigerating devices, radiation shields, special radiation resistant materials and the like. In order to reduce such special equipment to a minimum and at the same time have a practical amount of $U^{233}$ and $Pa^{233}$ for isolation by batch process, the reaction is terminated when a ratio of $U^{233}+Pa^{233}$ to $Th^{232}$ is not less than about 1 to 1 million and frequently is between about 1 to 10,000, and 1 to 1,000.

In order to ensure production of $U^{233}$ in a form recoverable in a concentrated state, the thorium subjected to treatment preferably is substantially free, or contains but negligible amounts, of natural uranium. In any case the amount of natural uranium present should not be in excess of 20 percent by weight of the $U^{233}$ produced and production of $U^{233}$ should be continued until at least 80 percent by weight of the total uranium content is $U^{233}$. Generally speaking the natural uranium content should not exceed about one part by weight per million parts by weight of thorium and preferably should be no more than one part in ten million parts of thorium.

The reaction of thorium with neutrons to produce $Pa^{233}$ and $U^{233}$ may be carried out with neutrons from any suitable neutron source. Where the neutron source provides fast neutrons of above 1 million electron volts, the fast neutrons are slowed to neutrons having energies of below 1 million electron volts by interposing neutron-slowing material between the fast neutrons and the thorium. Such neutron-slowing materials include carbon-containing, deuterium-containing, or hydrogen-containing material, for example, graphite, paraffin, water, and heavy water ($D_2O$). Sufficient neutron-slowing material is used so that at least a majority of the neutrons are slowed to energies of below about 1 million electron volts, since at higher energies there is less production of $U^{233}$ and considerable fission of the thorium. We may interpose the neutron-slowing material between the fast neutrons and the thorium-containing mass, or we may admix neutron-slowing material with the thorium. An intimate mixture of thorium with neutron-slowing material may be readily obtained by using hydrated thorium compounds, such as $Th(OH)_4 \cdot XH_2O$. Since the slow-neutron absorption cross section of thorium is some 10 to 40 times larger than that of hydrogen, we may suitably use a ratio as high as about two to four hydrogen atoms per thorium atom without losing any more than about 10 percent of the neutrons as a result of absorption by hydrogen.

While neutrons obtained from any suitable neutron source may be used, it is desirable to subject the thorium to neutrons from a high-intensity source in order that suitable concentrations of $Pa^{233}$ and $U^{233}$ may be obtained in a reasonable length of time.

Preferably, the thorium is subjected to slow neutrons from a neutron source capable of supplying at least $5 \times 10^{15}$ neutrons per second, and to secure a relatively high concentration of the $Pa^{233}+U^{233}$ the mass should weigh no more than about 20 tons. Moreover it is preferable to use a thorium-containing body sufficiently thick, for example 15 centimeters or more, to absorb at least 50 percent and preferably 75 percent or more of the neutrons so supplied. Such high neutron intensity may be obtained by subjecting thorium to the action of neutrons obtained by slowing down secondary neutrons obtained from a self-sustaining chain reaction of $U^{233}$, $U^{235}$ or $94^{239}$ with neutrons.

By placing the thorium adjacent to uranium and/or $94^{239}$ in amount sufficient to establish a self-sustaining neutron chain reaction dispersed in a neutron-slowing medium, such as carbon or $D_2O$, neutron intensities of between $5 \times 10^{17}$ and $10^{20}$ neutrons per second may readily be supplied to the thorium and absorbed to at least 50 to 75 percent thereof. A ratio of $U^{233}+Pa^{233}$ to $Th^{232}$ of at least 1 to 1 million may be attained in a reasonable length of time, such as one to three months.

In accordance with this invention a substantial concentrate of $U^{233}$ may be secured by irradiating thorium with neutrons as herein described, permitting the neutron-irradiated thorium to age to form a substantial amount of $U^{233}$ and recovering $U^{233}$. The period of aging is dependent largely upon the time of bombardment, and where bombardment has proceeded for several months further aging may be unnecessary.

Various methods of separation of uranium and thorium may be used. For example the thorium may be precipitated as a fluoride. In this method the neutron-irradiated thorium or thorium compound is dissolved in aqueous acid, such as nitric acid, and after adjustment of the pH to a value around one, the thorium is precipitated as the fluoride by the addition of hydrogen fluoride solution, with or without potassium fluoride, in excess of that theoretically required to form thorium fluoride. In this operation the $U^{233}$ is separated from the thorium since it remains in solution as the soluble uranyl fluoride. The $Pa^{233}$ also remains in solution. It is important that there be present before the precipitation some oxidizing agent, such as nitric acid, so as to be sure that the uranium is in the uranyl form.

Other processes of separating thorium may be used. Thus the thorium may be precipitated from the acid solution as the insoluble thorium iodate, oxalate or phosphate upon the addition of an alkali iodate, oxalate or phosphate salt in amount in excess of that theoretically required to form the corresponding thorium compound, while the soluble uranyl iodate, oxalate or phosphate remains in solution. In such a case the $Pa^{233}$ will be substantially completely removed from solution with the precipitated iodate, oxalate or phosphate. In general, precipitants of the type capable of precipitating thorium and rare earths from acid solution are suitable for this purpose.

Following removal of the thorium precipitate the uranium may be recovered by suitable means. For example the uranium may then be separated from the uranyl fluoride, oxalate, phosphate or iodate solution by the addition of alkali, such as sodium hydroxide or ammonium hydroxide. Any fission products and $Pa^{233}$ present with the $U^{233}$ at this stage may be removed by converting the $U^{233}$ to the uranyl nitrate generally and in particular to an aqueous solution thereof and extracting this with ether so as to leave the fission products and $Pa^{233}$ in the aqueous phase.

In accordance with a further method the uranium may be recovered or separated by means of a so-called dry process in which the bombarded thorium is converted to a fluoride comprising a mixture of thorium and protactinium fluorides. This may be done by reacting thorium metal or oxide containing $U^{233}+Pa^{233}$ with hydrogen fluoride gas at about 500° C. The resultant fluorides may be allowed to age over a period of several months for example 2 to 3 months in order that a substantial quantity, for example, 70 to 80 percent or more of the $Pa^{233}$ may convert to $U^{233}$, and then the mass may be heated at 500° C. in an atmosphere of elemental fluorine whereby uranium hexafluoride is vaporized from the thorium fluoride and may be condensed and collected as a concentrate.

In the specification and claims, wherever reference is made to the presence or the addition of phosphoric acid or a phosphate, it is to be understood that the reference is to orthophosphoric acid or its salts.

By the above method of separating $Pa^{233}$ and $U^{233}$ from foreign products we are able to obtain compositions composed largely or entirely of $U^{233}$ compounds, which are substantially free from fission products. The $U^{233}$ metal may be produced from suitable compounds thereof by sodium reduction or any of the other known methods for producing uranium metal from compounds of uranium.

$U^{233}$ metal or compounds of $U^{233}$ may be shaped into the form of spheres, cylinders, blocks or the like by known methods of shaping uranium metal and compounds. Such shaped articles of manufacture may be used as a source of nuclear power as described in our copending application, Serial No. 565,990, filed November 30, 1944.

While there have been described certain embodiments of our invention, it is to be understood that it is capable of many modifications. Changes, therefore, may be made without departing from the spirit and scope of the invention as described in the appended claims, in which it is the intention to claim all novelty in the invention as broadly as possible.

We claim:

1. The method of separating $U^{233}$ values from thorium and foreign products present in neutron-irradiated thorium, said foreign products including protactinium and fission products, which consists of dissolving the thorium, the foreign products and the uranium values in aqueous nitric acid, adding a precipitant of the class consisting of soluble fluorides, soluble iodates, soluble phosphates, and soluble oxalates whereby the thorium and foreign products are precipitated while the uranium values remain in solution, separating the solution of uranium values from said precipitate, precipitating the uranium values from said last-mentioned solution by alkalizing said solution whereby the uranyl ions present are converted to the uranate form, and separating said precipitated uranium values.

2. The method of separating $U^{233}$ values from thorium and foreign products present in neutron-irradiated thorium, said foreign products including protactinium and fission products, which consists of dissolving the thorium, said foreign products and the uranium values in aqueous nitric acid, adding a soluble fluoride to the solution whereby the thorium and foreign products are precipitated while the uranium values remain in solution, separating the solution of uranium values from said precipitate, precipitating the uranium values from said last-mentioned solution by alkalizing said solution whereby the uranyl ions present are converted to the uranate form, and separating said precipitated uranium values.

3. The method of separating $U^{233}$ values from foreign products present in neutron-irradiated thorium, said foreign products including protactinium and fission products, which consists of dissolving the thorium, said foreign products and the uranium values in aqueous nitric acid, adding a soluble iodate to the solution whereby the thorium and foreign products are precipitated while the uranium values remain in solution, separating the solution of uranium values from said precipitate, precipitating the uranium values from said last-mentioned solution by alkalizing said solution whereby the uranyl ions present are converted to the uranate form, and separating said precipitated uranium values.

4. The method of separating $U^{233}$ values from thorium and foreign products present in neutron-irradiated thorium, said foreign products including protactinium and fission products, which consists of dissolving the thorium said foreign products and the uranium values in aqueous nitric acid, adding a soluble phosphate to the solution whereby the thorium and foreign products are precipitated while the uranium values remain in solution, separating the solution of uranium values from said precipitate, precipitating the uranium values from said last-mentioned solution by alkalizing said solution whereby the uranyl ions present are converted to the uranate form, and separating said precipitated uranium values.

5. The method of separating $U^{233}$ values from thorium and foreign products present in neutron-irradiated thorium, said foreign products including protactinium and fission products, which comprises forming a solution of neutron-irradiated thorium containing, said foreign products and uranium values in the uranyl state and having a pH of about 1, adding a soluble precipitant selected from the group consisting of iodate, oxalate, phosphate and fluoride whereby a precipitate comprising thorium and foreign products is obtained, separating the solution of uranium values from said precipitate, precipitating the uranium values from said last-mentioned solution by alkalizing said solution whereby the uranyl ions present are converted to the uranate form, separating said precipitated uranium values, acidifying said uranium values with aqueous nitric acid whereby they are converted to uranyl nitrate, dissolving said uranyl nitrate in ether leaving any protactinium in the aqueous nitric acid phase, and recovering relatively pure $U^{233}$ values from the ether solution.

6. The process of claim 5 wherein the precipitant is an iodate.

7. The process of claim 5 wherein the precipitant is an oxalate.

8. The process of claim 5 wherein the precipitant is a phosphate.

9. The process of claim 5 wherein the precipitant is a fluoride.

References Cited in the file of this patent

UNITED STATES PATENTS

| | | |
|---|---|---|
| 1,335,157 | Dietsche | Mar. 30, 1920 |
| 2,780,517 | Fontana | Feb. 5, 1957 |

OTHER REFERENCES

Mellor: "Comprehensive Treatise on Inorganic and Theoretical Chemistry," vol. 12, 1932, p. 76.

Lise Meitner et al.: Z. Physik, vol. 109, 1938, pp. 538–52; Chem. Abstr., vol. 32, 1938, p. 7815.

Chapters in the Chem. of the Less Familiar Elements, by B. Smith Hopkins, vol. II, pub. by Stripes Pub. Co., Champaign, Ill., chap. 18, p. 7.

Otto Hahn et al.: Naturwissenschaften, vol. 29, 1941, pp. 285–6; Chem. Abstr., vol. 36, 1942, p. 6893.

Turner: Reviews of Modern Physics, vol. 12, p. 3 (January 1940).